Patented Nov. 1, 1938

2,135,443

UNITED STATES PATENT OFFICE 2,135,443

PROCESS OF MANUFACTURING POLYMERIZATION PRODUCTS

Daniel E. Strain, Wilmington, Del., assignor to E. I. du Pont de Nemours & Company, Wilmington, Del., a corporation of Delaware No Drawing. Application December 30, 1933, Serial No. 704,753. Renewed February 15, 1936

8 Claims. (Cl. 260—2)

This invention relates to the production of synthetic resins and particularly to an improved process for the manufacture of polymerization or interpolymerization products of acrylic acid, its homologues, esters, and derivatives thereof, and more particularly such products as methyl acrylate and methyl methacrylate (methyl ester of alpha-methacrylic acid).

In the application of these polymerization products to the industrial arts it has been found that the direct polymerization of the monomeric raw material yields a product which it is difficult to reduce to the finely divided form desirable and sometimes necessary, as, for instance, for the manufacture of molding compositions, lacquers, enamels, etc. That is to say, if, for example, methyl methacrylate is subjected to polymerizing conditions, e. g. to the action of heat, light, and/or a polymerizing catalyst, the product obtained is generally in a more or less massive form which, because of the inherent properties of the material, it is difficult to convert into powders or solutions.

This application is in part a continuation of my copending application Ser. No. 668,080, filed April 26, 1933.

It is an object of the present invention to provide an improved process for the manufacture of synthetic resins of the type referred to whereby the products are obtained in a physical form directly adapted to the use thereof in the applied arts. Another object of the invention is to provide a process of polymerizing the polymerizable products of acrylic acid, its homologues and esters thereof and more particularly the lower alkyl esters of the acrylic acid. Other objects and advantages of the invention will be apparent as it is better understood by reference to the following specification in which its details and preferred embodiments are described.

In accordance with the invention acrylic acid, its homologues and polymerizable derivatives such, for example, as the methyl acrylate and the liquid monomeric methyl ester of methacrylic acid as well as the unpolymerized derivatives of acrylic acid such, for example, as the amides, nitriles, the aryl and alkyl substituted amides as well as any suitable mixtures thereof are subjected to polymerizing conditions in the presence of a solvent medium in which the unpolymerized compound, the monomer, or monomers of the compound or compounds treated are soluble to a substantial degree but in which the polymer, interpolymer, or mixture of polymers are insoluble or only slightly soluble under the conditions of polymerization. The solvent medium may be added during the course of polymerization, but preferably the monomer or monomers are dissolved initially in the solvent and the solution subjected to polymerizing conditions. When precipitating methyl methacrylate it is advantageous to have the monomer completely in solution,—otherwise fused masses of the polymer will form from the undissolved monomer. Some monomers may be polymerized when only partially in solution, although usually complete solution is desired for the best product. As polymerization proceeds and the solubility limits of the polymer in the solvent medium are exceeded, the polymer precipitates in a form varying somewhat with the specific conditions, but generally separates as a mushy, flocculent mass, which may readily be broken up by shaking or stirring,— simultaneously with the precipitation of the polymer any undissolved and unpolymerized monomer present goes into solution. The polymer is separated from the solvent and unconverted monomer by filtration, centrifuging, or the like, and, after washing, it is dried at a suitably elevated temperature to remove excess solvent and traces of monomer.

A variety of solvents and solvent combinations are available for the purpose, the particular solvent medium to be chosen depending, inter alia, upon the compound treated and the specific conditions, e. g. the temperature under which it is desired to effect polymerization. Polymerized methyl or ethyl methacrylate, for example, is characterized by solubility in an unusual number of liquids, and hence the simple solvents available for the purpose are somewhat limited in number. The aliphatic alcohols, aliphatic ethers, gasoline, and similar aliphatic hydrocarbon and alicyclic hydrocarbons are the most suitable of this class. It has been found that the most satisfactory solvent medium comprises water (in which both monomer and polymer are insoluble), and a water-soluble solvent for the monomeric material, such as water-soluble monohydric aliphatic alcohols, for example, methyl, ethyl, and propyl alcohols, low boiling derivatives of the polyhydric alcohols, such as alkyl ethers of ethylene and diethylene glycol, water-soluble ketones, such as dimethyl and methyl-ethyl-ketone, and water-soluble organic acids, such as formic, acetic, and propionic acids. Methyl acrylate monomer may be polymerized in similar solutions but due to its lower fusing point care must be exercised that the polymerization medium is not too strong in solvent action on the polymer in order to prevent complete fusion of the separated polymer mass. Interpolymers may, of course, be precipitated in the same manner, a solvent being selected which dissolves the monomers but not the polymers of the compounds.

It is advantageous to employ a solvent medium of such boiling point that it can be removed from the polymer by evaporation at a temperature not exceeding that at which the resin will flow.

Although the process is, under any circumstances, a marked improvement over methods previously employed for the purpose, it has been found that the excellent results are obtained when the proportion of monomer to total volume of monomer and solvent medium is not in excess of 22% by volume. Operating within these limits, the polymeric product can generally be broken up merely by shaking, whereas with a larger proportion of monomer, although the cost of solvent and separation thereof is less, and the time required for polymerization somewhat shorter, the particles of polymer adhere to each other and to the sides of the reaction vessel. It is preferred, therefore, to operate within the limits stated.

If desired, the solution of monomer may be subjected to agitation during polymerization, e. g. by shaking or preferably by stirring. This to a large extent inhibits coalescing of the particles of polymer, greatly facilitates removal from the polymerizing vessel, and makes the product more readily comminutable.

Polymerization in solution in accord with my process may be carried out at room temperature and under atmospheric pressures. In order to shorten the time required to effect complete polymerization, however, temperatures of from 40° C. to 130° C. and pressures of 10 atmospheres or higher may be employed, if desired. Varying temperature and pressure will, of course, alter considerably the physical character of the product obtained and for general utility I employ the specific conditions given in the examples.

It is to be understood that, while the invention is particularly applicable to polymerization of the alkyl alkylacrylates by simple application of heat, other polymerizing agents, either alternatively or additionally, as, for instance, light (especially ultra-violet light), and/or catalysts, such, for example, as benzoyl peroxide may be used.

While in the following examples the invention is described with reference to certain specific proportions of materials and operating conditions, it is to be understood that the examples are merely illustrative and that the invention is not limited thereto.

*Example 1.*—A solution of 20 parts by weight of methyl methacrylate, 40 parts methyl alcohol, and 40 parts water was maintained at 65° C. in a closed vessel for four days. The polymer precipitated from solution as formed, yielding a finely divided spongy mass. The methanol-water solution was filtered off and the product washed with methanol, dried at room temperature for a few hours, and then dried at 140° C. for eight hours. The powdery polymer was in a form adapted directly for use in molding compositions and for the preparation of lacquers.

*Example 2.*—A solution of 20 parts by weight methyl methacrylate, 40 parts methanol, and 40 parts water was exposed six days at room temperature to the light from a mercury vapor arc. The polymer formed as a loose mass which was for the most part converted to a slurry by shaking the polymerization vessel. The product was filtered and dried.

*Example 3.*—A solution of 10 parts (by volume) methyl methacrylate, 40 parts methanol, and 50 parts water was exposed to the light from a mercury vapor arc for eight days. The polymerized methyl methacrylate separated out as a spongy porous material which could be worked into a slurry by shaking or stirring. The polymer was separated from the liquids present and dried at 100° C.

*Example 4.*—A solution of 20 parts (by weight) methyl methacrylate, 40 parts methanol, 40 parts water, and 0.02 parts benzoyl peroxide was maintained at 50° C. for five days. The polymer precipitated from solution as formed, yielding a finely divided spongy mass which could be broken up easily by stirring. The polymer was filtered off from the methanol-water solution, washed with methanol, air dried three hours, and dried at 120° C. for twelve hours. The dried material is light and fluffy, and can be easily reduced to a powder.

*Example 5.*—A solution of 7.8 parts (by weight) methyl methacrylate, 34.6 parts methanol, and 57.6 parts water was maintained at 65° C. for five days. The polymerized methyl methacrylate precipitated as formed in a finely divided state. Shaking or stirring converts the mass to a slurry. The polymer was filtered off from the methanol-water solution and thoroughly dried.

*Example 6.*—A solution of 3.3 parts (by weight) methyl methacrylate, 31.6 parts methanol, and 65.1 parts water was maintained at 65° C. for five days. Polymerized methyl methacrylate separated as a finely divided spongy mass which on shaking or stirring could be converted to a slurry. The polymer was filtered off from the methanol-water solution, washed with methanol, and dried.

*Example 7.*—A solution of 11 parts (by weight) methyl methacrylate, 35 parts methanol, 54 parts water, and 0.1 part benzoyl peroxide was maintained at 65° C. for 24 hours. A white sponge-like precipitate of methyl methacrylate polymer was formed. The contents of the polymerization vessel was stirred to a slurry. The polymer was filtered off, washed with methanol, and dried.

*Example 8.*—A solution of 10.6 parts (by volume) methyl methacrylate, 31.8 parts 95% ethanol, and 57.5 parts water was maintained at 65° C. for four days. The polymer precipitated from solution as formed, yielding a finely divided spongy mass. The water-alcohol solution was filtered off and the product was washed with methanol and dried.

*Example 9.*—A solution of 20 parts by weight methyl methacrylate and 80 parts methanol was exposed for two days at room temperature to the light from a mercury vapor arc. Polymerization was essentially complete and the polymer was precipitated as a porous spongy mass which after filtering and drying could be readily reduced to a powder.

*Example 10.*—A solution of 10 parts (by weight) methyl methacrylate, 90 parts low boiling gasoline, and 0.05 part benzoyl peroxide was maintained at 65° C. for two days. Gasoline was filtered off from the spongy precipitate of polymer and the product was thoroughly dried.

*Example 11.*—A solution of 12 parts (by weight) methyl methacrylate, 88 parts cyclohexane, and 0.1 part benzoyl peroxide was maintained at 65° C. for 24 hours. By this time the methyl methacrylate appeared to be completely polymerized and the polymer was deposited as a porous spongy mass. The polymerization vessel was shaken to produce a slurry of the polymer. The polymer was filtered from cyclohexane and dried.

Example 12.—A solution of 13.5 parts (by weight) methyl methacrylate, 86.5 parts hexane, and 0.1 part benzoyl peroxide was maintained at 65° C. for 24 hours in a closed container. Polymerization was essentially complete by this time and the methyl methacrylate polymer was deposited as a porous spongy mass which could be easily stirred to a slurry. The polymer was filtered, washed with hexane, and dried.

Example 13.—A solution of 12.5 parts (by weight) methyl methacrylate, 87.5 parts heptane, and 0.1 part benzoyl peroxide was maintained at 65° C. for 24 hours. The methyl methacrylate polymerized and as polymer was formed it precipitated as a loose flakey mass. The polymer was filtered from the heptane, washed with methanol, and dried.

Example 14.—A solution of 10 parts (by volume) methyl methacrylate and 90 parts low boiling gasoline was exposed to the light from a mercury vapor arc in a pyrex container for 12 days. Methyl methacrylate was polymerized and the polymer was deposited as a spongy mass which could be easily broken up, washed, dried, and powdered.

Example 15.—A solution of 10 parts (by volume) methyl methacrylate and 90 parts diisopropyl ether was exposed to the light of a mercury vapor arc for 12 days in a pyrex container. Methyl methacrylate was polymerized and the polymer was deposited as a spongy mass. This material was stirred, filtered, washed with methanol, and dried first at room temperature and finally at 120° C.

Example 16.—A solution of 10 parts (by weight) methyl methacrylate, 90 parts low boiling gasoline, and 0.05 part benzoyl peroxide standing over 100 parts water was maintained at 65° C. for three days. Methyl methacrylate polymer precipitated as formed as a loose flaky material most of which settled to the water layer. The polymer was filtered from gasoline and water, washed with methanol, and dried.

Example 17.—A mixture of 10 parts (by weight) methyl methacrylate, 45 parts methanol, 45 parts heptane, 100 parts water and 0.05 part benzoyl peroxide was maintained at 65° C. for 24 hours in a closed container. Throughout this time the liquid in the reaction vessel remained in two layers. The upper layer contained the heptane and the lower layer the water. Methanol and monomer were divided between the two layers, the methanol being largely in the lower layer and the monomer largely in the upper layer. The polymer formed as a loose flaky precipitate largely contained in the water layer. The organic layer was removed by decantation and the polymer was filtered from the aqueous layer. After washing with methanol, the polymer was thoroughly dried.

Example 18.—A solution of two parts (by weight) methyl methacrylate, 81.7 parts water, 16.3 parts methanol, and 0.02 part benzoyl peroxide was maintained at 65° C. for 24 hours with sufficient stirring to keep the liquid constantly in motion. A considerable portion of the methyl methacrylate had polymerized and was suspended as loose flakes in the liquid. The polymer was filtered from the solution, washed with methanol, and dried.

Example 19.—A solution composed of 150 c. c. methyl methacrylate, 50 c. c. methyl acrylate, 800 c. c. methanol, 1000 c. c. water and 2 gm. benzoyl peroxide was heated four days at 65° C. Polymerization was essentially complete at the end of one day's heating. The polymer was obtained as a porous structure which was separated from the liquids by filtration, stirred to a powder in a 50% water-methanol solution, filtered, and dried 8 hours at 120° C. The dried polymer was obtained as a finely divided powder in a form suitable for use in the production of molding compositions, coating compositions, etc.

Example 20.—A solution composed of 200 c. c. ethyl methacrylate containing 1% benzoyl peroxide, 900 c. c. methanol and 800 c. c. water was heated 4 hours at 65° C. The polymer formed was a flocculent material which was stirred to a slurry, filtered to remove water and methanol and dried 8 hours at 120° C.

Example 21.—A solution of 100 c. c. ethyl methacrylate, 100 c. c. methyl acrylate, 900 c. c. methanol, 900 c. c. water, and 2 gm. benzoyl peroxide was heated four days at 65° C. The porous polymer was filtered from water-methanol, stirred to a slurry with fresh water-methanol, filtered, and dried first at room temperature and then at 65° C.

Example 22.—A solution composed of 20 c. c. methyl acrylate, 100 c. c. water, 50 c. c. methanol, and 0.2 gm. benzoyl peroxide was heated five days at 65° C. Polymerization was essentially complete at the end of one day's heating. The polymer separated as a spongy mass. The liquid was drained away and the polymer was dried five hours at 65° C. in a vacuum oven. The final product was a porous material which could be reduced to small pieces. This material may be contrasted to methyl acrylate polymer produced by polymerization of undiluted monomer which is a tough, adhesive mass that cannot be readily handled or reduced to particles of the desired size.

Example 23.—A solution composed of 20 c. c. methyl acrylate, 20 c. c. methyl methacrylate, 130 c. c. methanol, 240 c. c. water and 0.2 gm. benzoyl peroxide was heated 48 hours at 65° C. The polymer was reduced to fine particles by stirring in a solution of equal parts water and methanol, filtered, and dried 20 hours in a vacuum oven at 65° C.

Various changes may be made in the method described without departing from the invention or sacrificing any of the advantages thereof.

I claim:

1. A process for the manufacture of a polymerized compound selected from the group consisting of acrylic acid, homologues of acrylic acid, alkyl esters, and nitriles of acrylic acid and the alkyl esters of homologues of acrylic acids which includes the step of subjecting the monomeric compound to polymerizing conditions while dissolved in a concentration of a solvent medium sufficient to maintain the monomeric compound in solution and in which medium the polymerization product is sufficiently insoluble to precipitate the polymerization product as it forms.

2. A process for the manufacture of a polymerized alkyl acrylate which includes the step of subjecting a monomeric alkyl acrylate to polymerizing conditions while dissolved in a concentration of a solvent medium sufficient to maintain the monomeric compound in solution and in which medium the polymerization product is sufficiently insoluble to precipitate the polymerization product as it forms.

3. A process for the manufacture of polymerized methyl acrylate from unpolymerized methyl acrylate which includes the step of subjecting monomeric methyl acrylate to polymerizing conditions while dissolved in a concentration of a solvent medium sufficient to maintain the monomeric compound in solution and in which medium the polymerized methyl acrylate is sufficiently insoluble to precipitate the polymerized methyl acrylate as it forms.

4. Process of claim 1 in which the solvent medium comprises a mixture of water and a water-miscible organic solvent for the monomer.

5. Process of claim 1 in which the solvent medium comprises a mixture of water and of a water-soluble aliphatic alcohol.

6. Process of claim 1 in which the solvent medium comprises a mixture of water and methanol.

7. Process of claim 1 in which the solvent medium comprises a mixture of water and a water-soluble organic acid.

8. Process of claim 1 in which the proportion of monomer is not more than 22% by volume of the total volume of monomer and solvent medium.

DANIEL E. STRAIN.